(12) United States Patent
Kailash et al.

(10) Patent No.: US 8,205,264 B1
(45) Date of Patent: Jun. 19, 2012

(54) METHOD AND SYSTEM FOR AUTOMATED EVALUATION OF SPAM FILTERS

(75) Inventors: Kailash Kailash, San Jose, CA (US); Jose Raphel, Austin, TX (US); Sriram Natarajan, Norcross, GA (US)

(73) Assignee: Zscaler, Sunnyvale, CA (US)

(*) Notice: Subject to any disclaimer, the term of this patent is extended or adjusted under 35 U.S.C. 154(b) by 389 days.

(21) Appl. No.: 12/554,873

(22) Filed: Sep. 4, 2009

(51) Int. Cl.
*H04L 29/06* (2006.01)

(52) U.S. Cl. ............. 726/25; 726/22; 709/223; 709/224

(58) Field of Classification Search .................. 726/25
See application file for complete search history.

(56) References Cited

U.S. PATENT DOCUMENTS

| | | | |
|---|---|---|---|
| 7,366,761 B2* | 4/2008 | Murray et al. | 709/206 |
| 7,640,313 B2* | 12/2009 | Rounthwaite et al. | 709/206 |
| 7,693,945 B1* | 4/2010 | Dulitz et al. | 709/206 |
| 7,937,468 B2* | 5/2011 | Libbey et al. | 709/225 |
| 2004/0128355 A1* | 7/2004 | Chao et al. | 709/206 |
| 2005/0080856 A1* | 4/2005 | Kirsch | 709/206 |

* cited by examiner

*Primary Examiner* — Ponnoreay Pich
(74) *Attorney, Agent, or Firm* — Clements Bernard PLLC; Lawrence A. Baratta, Jr.; Christopher L. Bernard (57) ABSTRACT

A method for automated evaluation of a SPAM filter rates a sender-receiver pair based on traffic information related to the sender-receiver pair. A SPAM filter intercepts electronic messages transmitted between the sender-receiver pair and classifies them as either SPAM or HAM. On comparing the rating for the sender-receiver pair and the classification for an electronic message between the sender-receiver pair, the method generates a metric indicating the reliability of the spam filter. Repeating these steps for more than one electronic messages and related sender-receiver pairs, the method produces a set of metrics. One or more of the metrics from the set of metrics are used to calculate an evaluation factor for evaluating the SPAM filter.

27 Claims, 6 Drawing Sheets

METHOD AND SYSTEM FOR AUTOMATED EVALUATION OF SPAM FILTERS

TECHNICAL FIELD

The present invention relates to systems and methods for evaluation of SPAM filters that distinguish legitimate information, such as desirable mail, from undesired information, such as junk mail, and more particularly to calculating evaluation factors for a SPAM filter based on traffic between users.

BACKGROUND OF THE INVENTION

Cloud-based computing is a software deployment model that hosts applications as services for users across the internet. Users' computers (also known as clients) in a cloud-based network communicate via conventional means such as email, short message service (SMS) and instant messaging.

In addition to desirable messages (also referred to as HAM), considerable network traffic is generated by unsolicited messages (SPAM) sent to large numbers of recipients indiscriminately (known as spamming). Typically, SPAM messages advertise products and services, request charitable donations, or broadcast some political or social commentary. SPAM is often unwanted by recipients and is considered a waste of computing resources and network bandwidth. It also causes loss of productivity of the recipients of SPAM. Servers and/or clients include SPAM filters capable of separating SPAM from HAM. The SPAM filter can block or quarantine unknown messages based upon certain criteria such as the inclusion of an unwarranted character string, or based on a personal review by the receiving client.

The SPAM filter may refer to a white list to check whether messages between a sender-receiver pair have already been explicitly identified as HAM. A white list can be a list of specific elements whose inclusion in a message guarantee it will pass the SPAM filter and be delivered. For example, an email white list might allow emails from a particular domain name, messages from identified senders, or messages whose subject contains a specific word or phrase. In a communication system, a white list can contain information about sender-receiver pairs that are allowed to communicate with each other. If the sender-receiver pair is on the white list, the SPAM filter considers the message HAM and transmits it to the recipient. Conversely, a black list contains elements, such as strings or phrases, whose inclusion in a message results in the message being blocked. Black lists are employed extensively to identify SPAM and divert such messages from the receiving client.

SPAM filters are, however, not foolproof and can generate a number of false positives and false negatives. Additionally, because SPAM keeps changing, SPAM filters need to be updated periodically. For cloud-based messaging services, design and learning phases of new SPAM filters require considerable amount of testing and user feedback. For correct identification of SPAM and HAM, manual inspection of the message is often necessary.

It is highly desirable for cloud-based services, which often use multiple SPAM filters and frequent updates to the SPAM filter lists, to assess objectively the effectiveness of SPAM filters by using real-time traffic.

BRIEF SUMMARY OF THE INVENTION

One embodiment of the present invention describes a computer-implemented method for automated evaluation of a SPAM filter. The method rates a sender-receiver pair based on traffic information related to the sender-receiver pair. A SPAM filter intercepts electronic messages transmitted between the sender-receiver pair and classifies them as SPAM or not SPAM (or HAM). On comparing the rating for the sender-receiver pair and the classification for an electronic message between the sender-receiver pair, the method generates a metric indicating the reliability of the classification. Repeating these steps for more than one electronic messages and related sender-receiver pairs, the method produces a set of metrics. One or more of the metrics from the set of metrics are used to calculate an evaluation factors for evaluating the SPAM filter.

Another embodiment of the present invention is a system for automated evaluation of a SPAM filter. The system employs a rating module that rates a sender-receiver pair based on traffic information related to the sender-receiver pair. A SPAM filter intercepts electronic messages transmitted between the sender-receiver pair and classifies them as SPAM or not SPAM. Comparing the rating for the sender-receiver pair and the classification for an electronic message between the sender-receiver pair using a comparison module, the system generates a metric indicating the reliability of the classification. A computation module then computes an evaluation factor, based on the set of metrics, for evaluating the SPAM filter.

DETAILED DESCRIPTION OF THE INVENTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
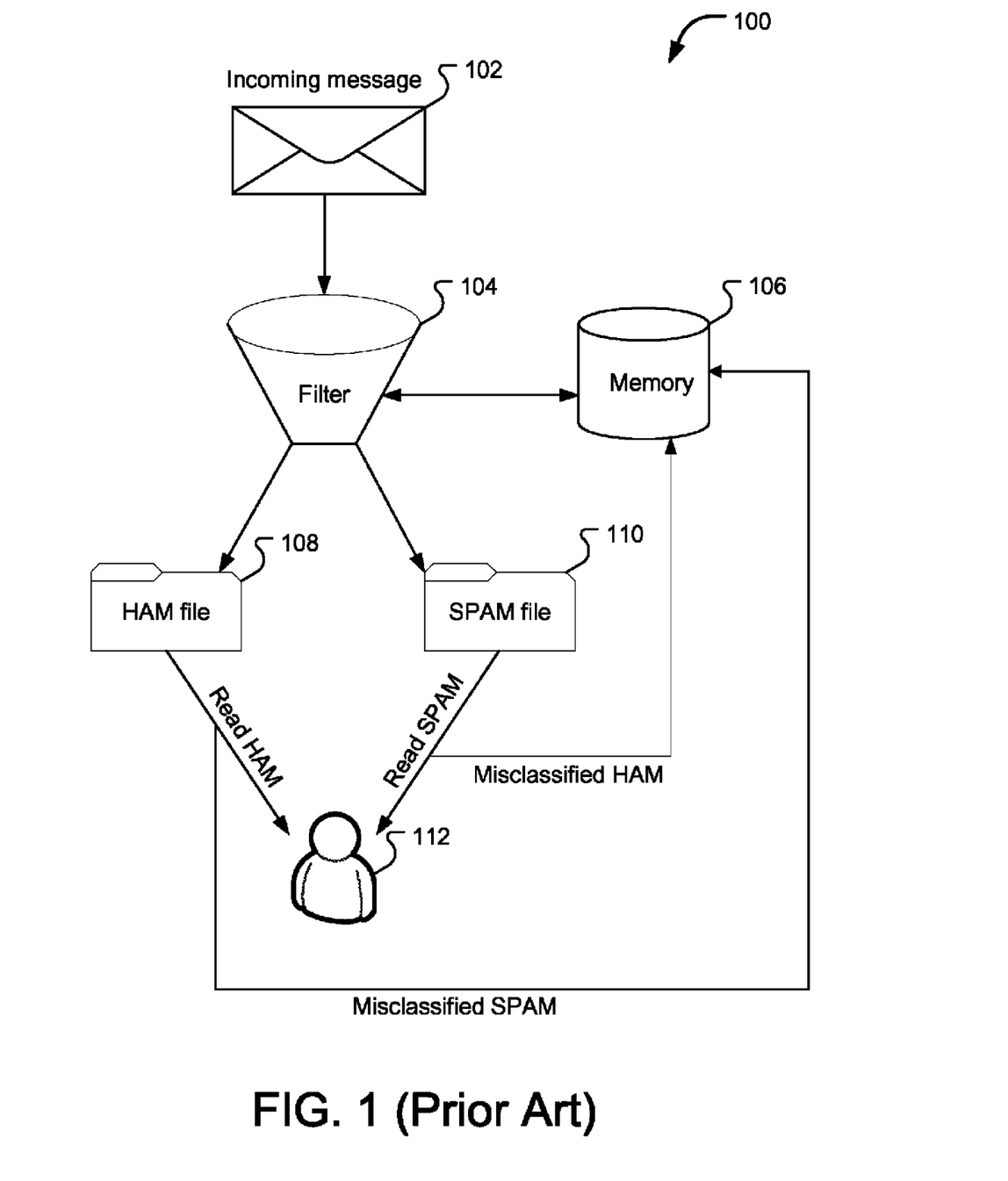
FIG. 1 illustrates a prior art system for filtering electronic messages.

FIG. 1 illustrates a prior art system 100 for filtering electronic messages. The system 100 can be associated with any known communication systems such as email, short message service (SMS) and instant messaging. An incoming message 102 usually goes through a filter 104 that classifies messages into SPAM or HAM. This classification is based on global statistics, collaborative judgements, network information, and black and white lists maintained in a memory 106. The filter 104 places the messages considered to be legitimate in a HAM file 108 (for example, in case of email messages, the HAM messages are placed in the recipient's inbox) and places messages classified as SPAM in a SPAM file 110 (for example, junk folder of an email account). Reading through the HAM file 108, a recipient 112 may encounter a misclassified SPAM message. Conversely, the recipient 112 may find a misclassified HAM message in the SPAM file 110. In the event of misclassifications, the recipient 112 can provide feedback to the filter 104 and the feedback can be incorporated in the filtering process, for example, in the form of updates to the black list on the memory 106. The nature of SPAM messages changes often, resulting in frequent misclassification of messages made by filter and a high requirement of user feedback. It is useful to benchmark the performance of a filter, and the claimed invention, as described in the following embodiments, provides a method and system for automated evaluation of a filter.

Figure 2:
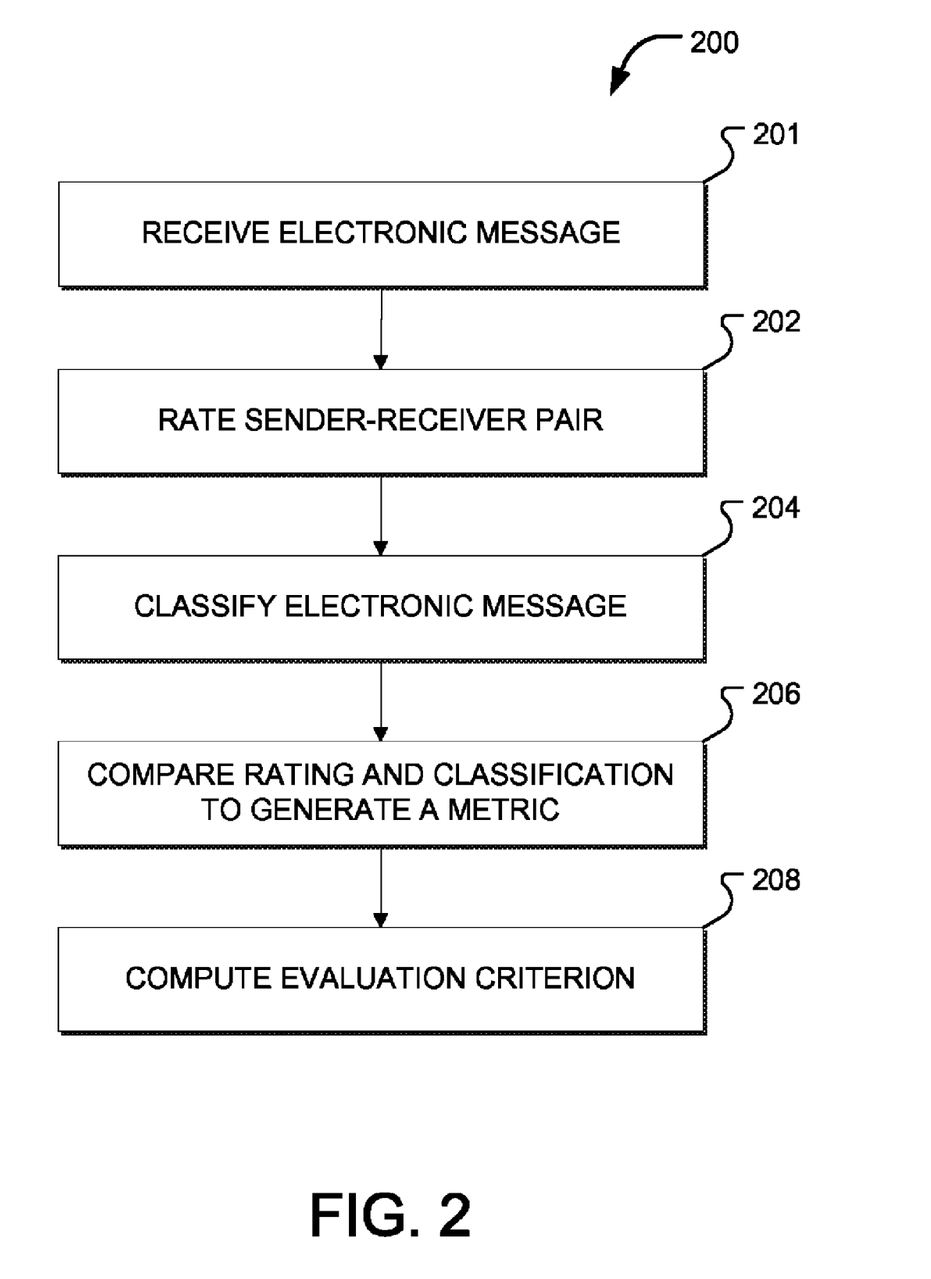
FIG. 2 is a flowchart of an embodiment of a computer-implemented method for automated evaluation of a SPAM filter.
Figure 3:
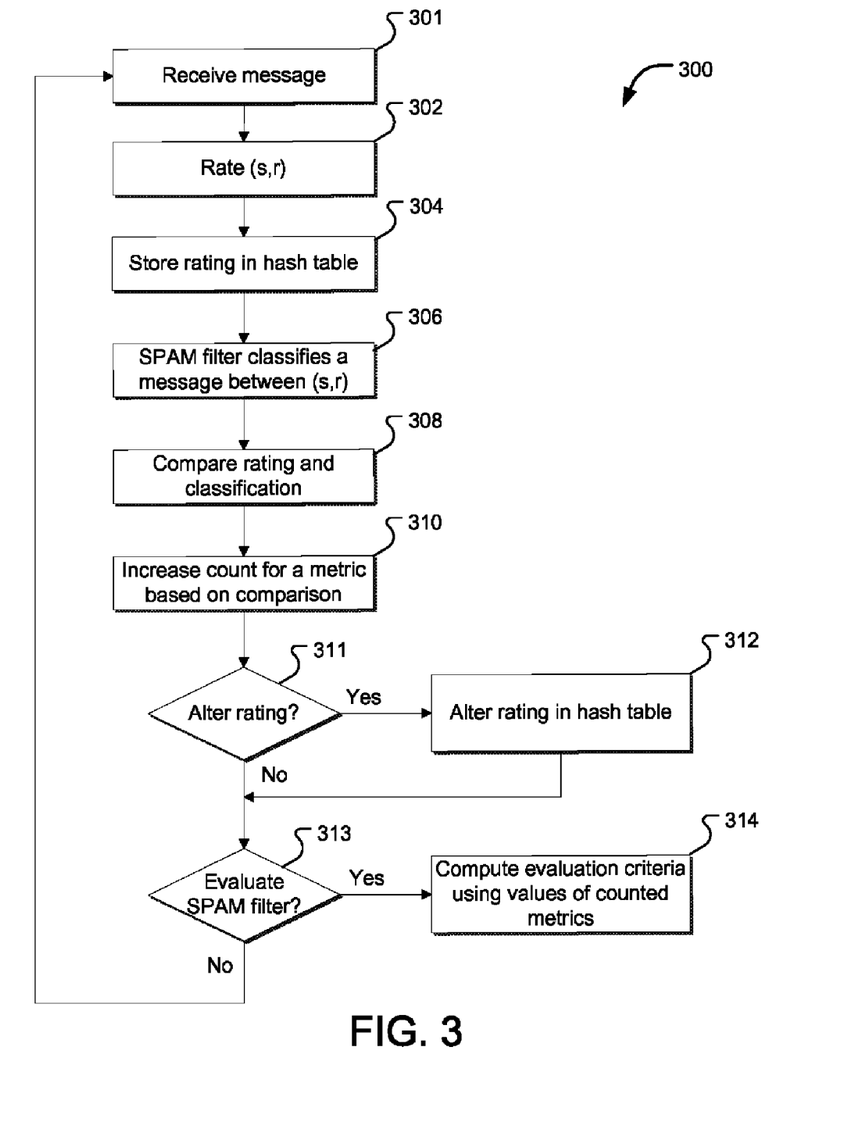
FIG. 3 is a flowchart depicting a detailed embodiment of a computer-implemented method for automated evaluation of a SPAM filter.
Figure 4:
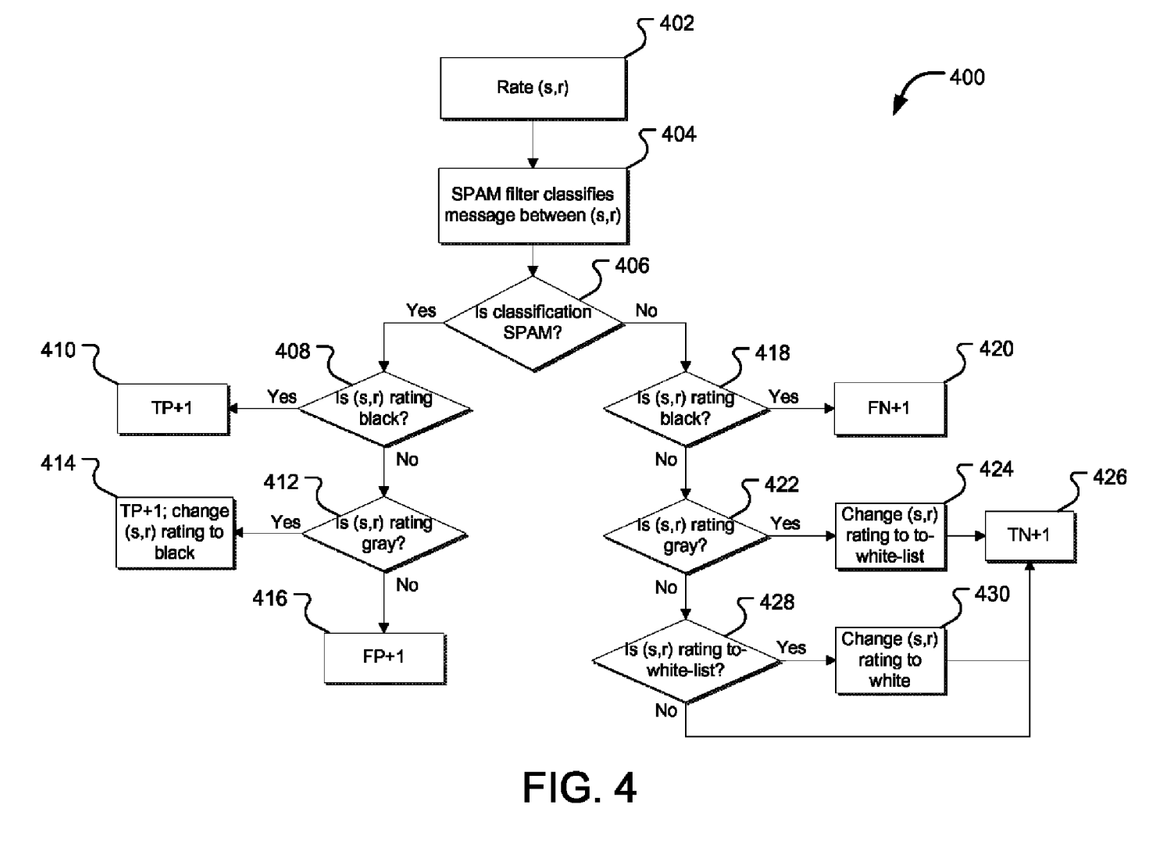
FIG. 4 is a flowchart of a method for comparing the rating of a sender-receiver pair and the classification of an electronic message exchanged between the sender-receiver pair.
Figure 5:
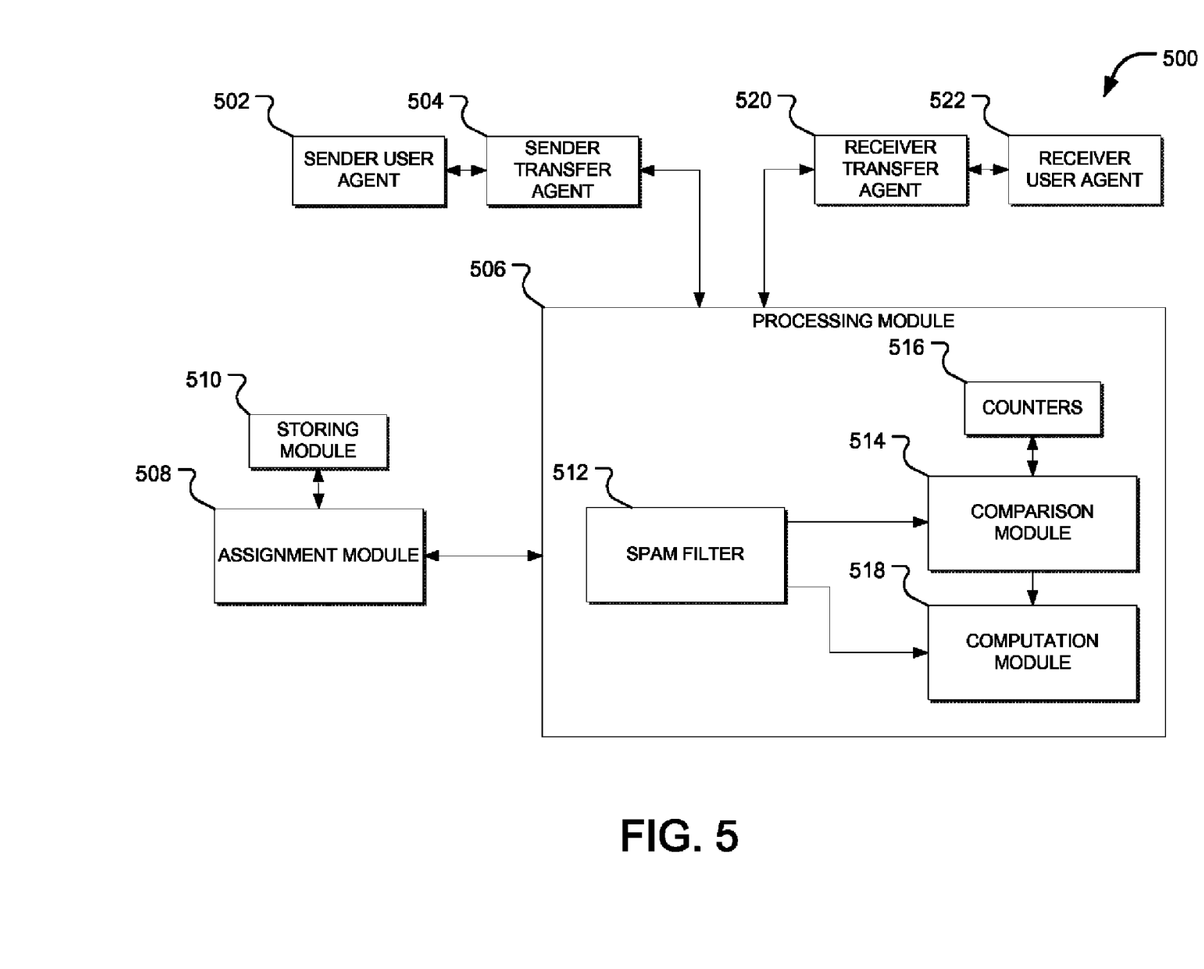
FIG. 5 illustrates an embodiment of a system for automated evaluation of a SPAM filter.
Figure 6:
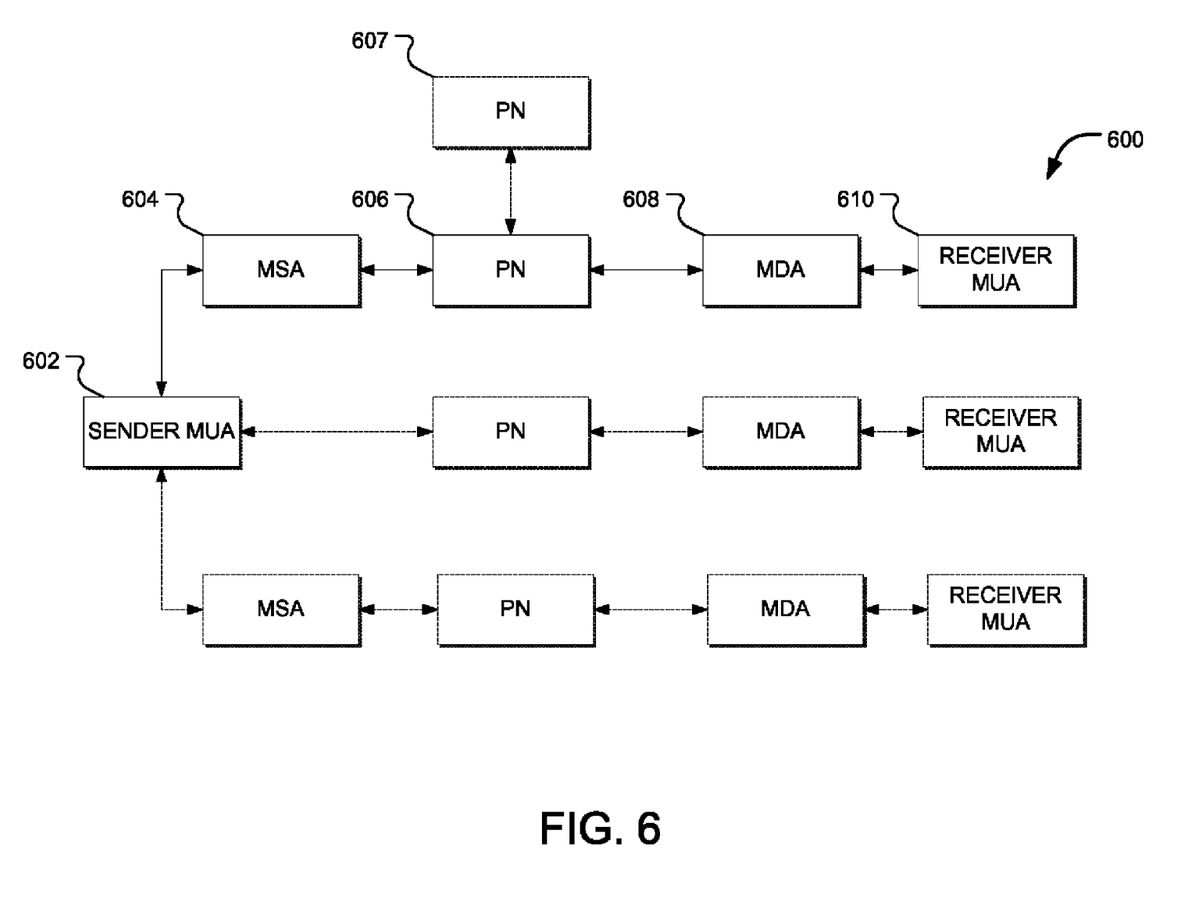
FIG. 6 illustrates an exemplary email communication system for automated evaluation of a SPAM filter.

The following discussion will first present and discuss the broad concepts of the invention, followed by several more detailed embodiments. Here, FIG. 2 depicts a broad overview of the claimed invention in a form that highlights the concepts applicable to different specific embodiments. Such an embodiment is presented and discussed with reference to FIG. 3, followed by FIG. 4 illustrating in detail one of the aspects of the embodiment described in FIG. 3. FIG. 5 shows a generic system that can be used to carry out the invention, while FIG. 6 is a system specific to email communication using Simple Mail Transfer Protocol (SMTP).

Turning now to FIG. 2, a method 200 for automated evaluation of a SPAM filter is described. Electronic messages such as emails, short message service messages (SMS) and instant messages pass through the SPAM filter, which classifies these messages as SPAM and HAM. Step 201 shows that the method 200 receives an electronic message and further, rates a sender-receiver pair based on traffic information related to the sender-receiver pair, at step 202. The general idea is that messages between a sender-receiver pair are likely to be HAM if there is considerable two way traffic between the sender-receiver pair. If however, the past communication between a sender-receiver pair has been one-way and the messages exchanged are few or infrequent, they are more likely to be SPAM. Based on this idea, the method 200 rates the sender-receiver pair. The rating belongs to an ordered list, the first rating in the ordered list indicating that the sender of the electronic message is known to send SPAM and the last rating in the ordered list indicating that the sender of the electronic message is known to send HAM. When a first message is exchanged between the sender-receiver pair, the method 200 assigns an initial rating to the sender-receiver pair. As two-way correspondence between the sender-receiver pair increases, the rating of the sender-receiver pair can be altered, indicating that electronic messages being exchanged are not likely to be SPAM, as both parties are choosing to correspond with each other. Absence of two-way correspondence would indicate otherwise, generally resulting in no change of the rating of the sender-receiver pair. In one embodiment, the rating of the sender-receiver pair is stored in a hash table. Here, a collision-resistant hash function provides a hash for the sender-receiver pair and a hash table stores this hash, along with the corresponding rating, for later retrieval.

A SPAM filter processes received electronic messages, and is later evaluated based on the processing of the messages, as described below. A SPAM filter intercepts electronic messages, such as emails, short message service messages (SMS) and instant messages, transmitted between the sender-receiver pair and classifies them as either 'SPAM' or 'not SPAM' (also known as HAM), as shown at step 204. On receiving an electronic message, the method 200 compares the rating for the sender-receiver pair involved in the electronic message and the classification given to the electronic message by the SPAM filter (as at step 206), generating a metric indicating the reliability of the classification. The method 200 can alter the rating for the sender-receiver pair based on the result of the comparison. On repeating these steps for a number of electronic messages and different sender-receiver pairs, the method 200 accrues values for a set of metrics. Each metric in the set characterizes the behavior of the SPAM filter. One metric may, for example, specify the number of false positives the SPAM filter generates. One or more of the metrics from the set of metrics are used to compute an evaluation factor for evaluating the SPAM filter, as shown at step 208. Several evaluation factors, such as precision, recall, f-measure and accuracy of a SPAM filter, are well known and understood in the art, and can be derived from the set of metrics.

In an alternate embodiment, instead of sender-receiver pairs, only senders' traffic is monitored. Further, the senders are rated and metrics derived from statistics related to the senders are used for calculating the evaluation factors. In general, if a sender has considerably more outgoing traffic as compared to incoming traffic, the sender has a higher likelihood of being a spammer.

In another embodiment, for facilitating continuous rating, numerical score values are awarded to each sender or sender-receiver pair. The numerical scores may be awarded based on criteria such as the number of HAM messages sent. Further, a sender or sender-receiver pair can be awarded negative score values if the sender is found to be sending SPAM messages. A final score is calculated after a certain interval (which can be a fixed time interval or an interval during which a certain number of messages are sent) and the corresponding sender-receiver pair or sender is rated accordingly. As a result, a sender or sender-receiver pair is assigned a rating only after the interval is over.

As noted above, the description in connection with FIG. 2 presented an embodiment in broad strokes. FIG. 3 depicts a computer-implemented method 300 for automated evaluation of a SPAM filter. Moreover, FIG. 3 provides a detailed implementation of method 200, elaborating on the storage of the rating and the comparing step 206 of FIG. 2.

In the present embodiment, a sender-receiver pair's traffic information assists in determining whether the exchanged messages are SPAM or HAM. The method 300 receives an electronic message transmitted between a sender-receiver pair at step 301, and subsequently rates the sender-receiver pair, as shown at step 302. If this is the first time an electronic message is transmitted between the sender-receiver pair, the method 300 rates this sender-receiver pair 'gray'. Moreover, the sender-receiver pair information is placed in a storage area along with the rating, for later retrieval. As an example, consider a hash table as the storage area. A collision-resistant hash function generates a hash for the sender-receiver pair and this hash is stored in the hash table, along with the 'gray' rating. If, however, the electronic message is not the first message exchanged between the sender-receiver pair, an entry will already exist for the pair in the hash table. The method 300 finds this entry and makes changes if necessary, as will be described later in this description. It should be understood that, generally, an electronic message generated by a sender is considered HAM. In the present embodiment, however, to reduce the possibility of certain malware agents (such as viruses) generating messages from an infected sender's account, the method 300 considers the sender-receiver pair as a non-SPAM pair of users only if three message exchanges take place between the sender and receiver. The following paragraphs describe this process specifically.

The present embodiment includes four ratings, which are 'black', 'gray', 'to-white-list', and 'white'. Considering the earlier example employing a hash table as a storage area, a user pair $(s, r_p)$ enters the hash table on exchange of a first electronic message with a gray rating. The rating is upgraded to to-white-list when the user $r_p$ replies to the electronic message or sends a new message to s. When another electronic message is sent from the user s to user $r_p$, the method 300 rates the user pair $(s, r_p)$ 'white', a step also referred to as being placed in the white list. It can be seen from the description above that an electronic message originating from a client enters the hash table with rating 'gray,' and after only three message exchanges, the rating is converted to a white list entry.

The forthcoming steps describe how white lists and black lists are automatically generated in the present embodiment. Assume that the sender named in the electronic message is s and the recipients are listed as $r_1, \ldots, r_n$. The method 300 creates a list of sender-receiver pairs $(s, r_1), (s, r_2) \ldots (s, r_n)$. Each sender-receiver pair is hashed using a collision-resistant hash function to generate a hash, which is entered into a hash table, as shown at step 304.

As mentioned earlier, if the electronic message exchanged between a sender-receiver pair, for example $(s, r_p)$, is the first message exchanged between the sender-receiver pair, the hash corresponding to the sender-receiver pair is rated gray in the hash table. It is often difficult to identify a sender as a spammer or otherwise, based on one message sent to a receiver. Here, instead of placing the sender on a white list or a black list, the sender-receiver pair is rated 'gray'. Alternatively, if an entry corresponding to $(s, r_p)$ is already present in the hash table, that fact signifies that more than one message has been exchanged between pair $(s, r_p)$. If the entry in the hash table has rating to-white-list, then the rating is upgraded to white (also referred to as the sender-receiver pair being on the white list). If the existing rating is black (also referred to as the sender-receiver pair being on the black list), then it is upgraded to gray. The higher the number of messages exchanged between $(s, r_p)$, the higher the likelihood that these messages are desirable to both sender and receiver, and do not comprise SPAM. Upgrading rating each time a message is exchanged between a sender-receiver pair identifies the sender-receiver pair as legitimate, non-SPAM users. Here, two bits in each hash entry suffice to signify the rating of the hash entry, or other appropriate or convenient coding can be employed. In order to alter the rating, these two bits are altered accordingly.

Subsequently, a response may be sent by subscriber $r_p$ to subscriber s. The method 300 locates the pair $(s, r_p)$ in storage, and it upgrades the pair's rating, as described above. For example, if the stored entry has rating gray, a response from subscriber $r_p$ causes, the rating of the pair $(s, r_p)$ to be upgraded to to-white-list.

At step 306, a SPAM filter intercepts an electronic message and classifies it as being either SPAM or HAM based upon certain criteria such as the inclusion of an unwarranted character string. Then, the method 300 searches for the hash corresponding to the sender-receiver pair in the hash table. At this point, if the hash for the corresponding sender-receiver pair is not found in the hash table, a hash is generated as described earlier and rated gray. The method 300 then compares the classification for the electronic message with the rating stored for the corresponding sender-receiver pair at step 308. The details of the various possible outcomes for this comparison are discussed with reference to FIG. 3. At this point, it suffices to say that the comparison indicates a true positive, true negative, false positive or false negative occurring in the SPAM filter's classification of messages. The SPAM filter is coupled to four counters. Each counter produces a metric by counting the number of occurrences of either of true positives, true negatives, false positives, or false negatives. Depending on the outcome of the comparison, the count for one of the metrics is increased, as shown at step 310. Moreover, this outcome can result in a determination that the rating needs to be altered (at step 311). The method 300 then alters the rating of the sender-receiver pair (step 312) in the storage area.

Steps 302 to 313 are repeated for numerous transmitted electronic messages and sender-receiver pairs, resulting in four metrics. The method 300 collects these metrics until the SPAM filter is to be evaluated (decided at step 313). Until the time the SPAM filter is evaluated, each new electronic message goes through the appropriate steps of the method 300 ('no' path from step 313), beginning from step 301.

Using the metrics collected, standard evaluation factors such as precision (a measure of repeatability; ratio of messages correctly identified as SPAM by the SPAM filter and the total number of messages identified as SPAM), recall (a measure of completeness; ratio messages correctly identified as SPAM by the SPAM filter to the total number of SPAM messages) messages, f-measure (measure of strength of the SPAM filter; harmonic mean of precision and recall), and accuracy (measure of correctness; ratio of messages correctly identified as either SPAM or HAM and the total number of messages screened) can be computed, as shown at step 314. Following are four equations used to calculate these evaluation criteria:

$$\text{Precision (P)} = TP/(TP+FP) \quad (1)$$

$$\text{Recall (R)} = TP/(TP+FN) \quad (2)$$

$$F\text{-Measure} = 2*P*R/(P+R) \quad (3)$$

$$\text{Accuracy} = (TP+TN)/(FP+FN+TP+TN) \quad (4)$$

In equations (1), (2), (3) and (4), TP represents the number of true positives, TN is the number of true negatives, FP is the number of false positives, and FN represents the number of false negatives. P and R, as shown, are precision and recall, respectively. F-measure and accuracy are used to evaluate the SPAM filter. It should be noted that the higher the accuracy, the better the spam filter is considered to be. Similarly, a higher value of F-measure is associated with a superior spam filter.

As noted above, an alternate embodiment, a sender, rather than a sender-receiver pair, is rated based on the traffic information related to the sender only. The steps performed in the description of FIG. 3, in relation with a sender-receiver pair, are performed for each sender in this embodiment. In general, if a sender has considerably more outgoing traffic as compared to incoming traffic, the sender has a higher likelihood of being a spammer.

Yet another embodiment facilitates continuous rating by awarding numerical score values to each sender or sender-receiver pair. The numerical scores may be awarded based on criteria such as the number of HAM messages sent. Further, a sender or sender-receiver pair can be awarded negative score values if the sender is found to be sending SPAM messages. A final score is calculated after a certain interval (which can be a fixed time interval or an interval during which a certain number of messages are sent), and the corresponding sender-receiver pair or sender is rated accordingly. For example, a sender or sender-receiver pair is awarded a numerical score in the range 0 to 100 and the final numerical score, calculated at the end of each interval, is mapped to indicate black, gray, to-white-list, and white ratings. A score of less than or equal to 30 results in a black rating. Any value from 30 to 60 results in a gray rating, a value between 60 to 80 in a to-white-list rating and values from 80 to 100 in a white rating. A sender or sender-receiver pair is assigned a rating only after the interval is over.

Turning now to FIG. 4, a method 400 for comparing the rating of a sender-receiver pair and the classification of a message exchanged between sender-receiver pair is described. As discussed in previous embodiments, a sender-receiver pair (s, r) is rated based on the number of messages exchanged between the sender and receiver (shown at step 402). When the SPAM filter encounters an electronic message exchanged between the sender and receiver, it classifies the message as either SPAM or not SPAM (step 404). The method 400 then proceeds to search for an entry corresponding to the sender-receiver pair in the hash table. If such an entry is not found, the method 400 computes a hash for the sender-receiver pair and makes an entry in the hash table with rating gray. The method 400 then compares the rating and the classification related to the electronic message.

If the electronic message is classified as SPAM by the SPAM filter (yes' path from step 406), and the corresponding sender-receiver pair is on the black list (yes' path from step 408), a true positive is generated (step 410). If, however, the corresponding sender-receiver pair is rated gray ('yes' path from step 412), a true positive is reported (step 414). Also, now that this electronic message has been identified as SPAM by the SPAM filter, the corresponding sender-receiver pair is placed on the black list (step 414). Otherwise, a false positive is reported (i.e., if the sender-received pair was rated either white or to-white-list) as shown at step 416 ('no' path from step 412).

A message classified as HAM by the SPAM filter ('no' path from step 406) and the corresponding sender-receiver pair being on the black list ('yes' path from step 418) results in a false negative, as shown at step 420. If the corresponding sender-receiver pair is rated gray ('yes' path from step 422), the method 400 updates its rating to to-white-list (step 424), and a true negative is reported (step 426). Similarly, if the sender-receiver pair is rated to-white-list ('yes' path from step 428), its rating is updated to white (at step 430). This also counts as a true negative, as shown at step 426. In the event that the corresponding sender-receiver pair is already on the white list ('no' path from step 428), the method 400 simply reports a true negative (step 426).

The method 400 accrues the metrics on the number of false negatives, false positive, true negatives, and true positives based on observing SPAM filter decisions for several exchanged electronic messages. These metrics are subsequently used to calculate evaluation criteria for the SPAM filter, as already discussed in relation with FIG. 3.

FIG. 5 sets out a system 500 for automated evaluation of a SPAM filter. The system 500 includes a sender user agent 502 that creates an electronic message for a receiver. A sender transfer agent 504 receives the electronic message from the sender user agent 502 and forwards it to the next transfer agent. A processing module 506 intercepts the electronic message and performs various processing steps including separating the incoming messages into SPAM and HAM.

A rating module 508 provides a rating to sender-receiver pair based on related traffic information and stores the rating in a storing module 510. In one implementation, the storing module 510 includes a hash table for storing the hash for the sender-receiver pair, along with the corresponding rating, for later retrieval. A collision-resistant hash function is applied to generate the hash. In general, the rating module 508 monitors traffic information for several sender-receiver pairs and maintains ratings for these pairs in the storage module 510.

The processing module 506 includes a spam filter 512, a comparison module 514 coupled to counters 516, and a computation module 518. When an electronic message between the sender-receiver pair is received at the processing module 506, the SPAM filter 512 classifies the electronic message as either SPAM or not SPAM. The processing module 506 is coupled with the rating module 508 and can access the stored ratings of sender-receiver pairs. In one embodiment, the rating module 508 and the storing module 510 are part of the processing module 506.

The comparison module 514 compares the stored rating for the sender-receiver pair retrieved from the rating module 508 and the classification of the electronic message made by the SPAM filter 512, generating a metric indicating the reliability of the classification. In one embodiment, the comparison indicates a true positive, true negative, false positive, or false negative occurring in the identification of SPAM. Counters 516 count the number of occurrences of true positives, true negatives, false positives, and false negatives. Depending on the outcome of the comparison, one of the counters 516 is incremented.

The processing module 506 processes numerous transmitted electronic messages relating to several different sender-receiver pairs, resulting in four metrics as described above. Once these metrics have been accrued, the computation module 518 can compute an evaluation factor, based on one or more of the accrued metrics, for evaluating the SPAM filter 512. Standard evaluation criteria such as precision, recall, f-measure, and accuracy are computed, as discussed in relation with step 314 of FIG. 3.

Each message passing through the processing module 506 and classified as HAM is subsequently routed to a receiver transfer agent 520 that receives the electronic message and delivers it for storage at the receiver user agent 522. The processing module 506 can classify a message as SPAM, sending it into quarantine.

FIG. 6 illustrates an exemplary email communication system 600 for automated evaluation of a SPAM filter. It should be understood that although this embodiment is specific to email communication, the claimed invention can be practiced in any communication system designed for exchange of messages such as instant messaging on the internet and SMS on a cellular phone network. Following is a brief explanation of email communication, beginning with definitions of a few terms that will be referred to often in the discussion of the present embodiment.

Mail User Agent (MUA): Responsible for submission of an email from a client and processing the inbox of the client. It is a front-end computer program for managing email.

Mail Transfer Agent (MTA): An SMTP server that can receive, send or relay SMTP messages. It is a computer program or software agent that transfers email messages from one computer to another.

Mail Submission Agent (MSA): An MTA that receives email from MUA and forwards it to another MTA for delivery. It is a computer program or software agent, which receives email messages from a MUA and cooperates with a MTA for delivery of the email messages.

Mail Delivery Agent (MDA): An MTA that receives SMTP messages and stores them in the user's inbox. It is software for delivering email messages received on a mail server, and for distributing the emails to recipients' individual mailboxes.

Processing Node (PN): A specialized MTA that receives and processes email and also, separates the email into SPAM and HAM. Generally, SPAM is quarantined, and HAM is sent to the MDA.

At the sender end, an MUA works on behalf of clients to create an email message and performs an initial "submission" into the transmission infrastructure via an MSA. After accepting the message submission, the MSA performs any necessary preprocessing on the message and relays the message to another MTA for transmission. Usually, MTAs relay messages to other MTAs in a sequence, reaching a destination MDA, which in turn delivers the email to the recipient's inbox. The inbox is part of the recipient-side MUA that works on behalf of the client to process received mail.

FIG. 6 shows a sender MUA 602 that sends an email message to multiple receivers. A MSA 604 receives the email message, performs any necessary pre-processing on the message and relays it to another MTA for subsequent delivery to the addressed receiver.

Email SPAM filter evaluation in a cloud-based service is implemented through a distributed system of nodes. One implementation deploys a distributed collection of specialized MTA nodes called Processing Nodes (PN). Each PN acts as a proxy between sending and receiving MTAs for email communication, examining email messages for undesirable content using techniques well known in the art. A PN, which may be a transparent MTA with no store-and-forward capability, performs various functions such as filtering of the email traffic, classification of the emails, and selectively quarantining of the email communication that may be violating an organization's security policy. By placing messages identified as carrying undesirable content in quarantine, PNs prevent delivery of emails sent from undesirable senders. A PN may not have storage space for emails, allowing the emails to be stored either in the receiver MDA or in a quarantine MDA, based on the result of the filtering.

A PN 606 intercepts the communication from the MSA 604 by virtue of the traffic redirection for outbound email. In one embodiment, the PN 606 intercepts emails between an MSA and an MTA. In an alternate embodiment, the PN 606 lies between two MTAs. In yet another embodiment, at the egress router of an enterprise, a traffic redirection policy is created to send all port 25 (SMTP) communications to the PN 606. For inbound email, the Mail Exchanger (MX) records for the hosted domain are changed to point to the PN 606. The MSA 604 may be either in the enterprise or in a data center external to the enterprise.

In the present embodiment, the PN 606 performs the functions described in relation with the processing module 506 in FIG. 5. The rating module 508 and the storing module 510 exist on another PN 607 and perform their respective functions. PN 606 is coupled to PN 607 (shown in dashed lines in FIG. 6) and accesses the sender-receiver pairs through PN 607. In an alternate embodiment, the rating module 508 and the storing module 510 exist on PN 606, eliminating the need for PN 607.

Returning to the system 600, when a subscriber of the email service submits an email through the PN 606, the subscriber's MSA 604 connects to the PN 606 and exchanges the email according to the SMTP protocol. Assuming that the SPAM filter in the PN 606 classifies the email as HAM, the PN 606 forwards it to an MDA 608 for subsequent delivery to the recipient's MUA 610. Alternatively, if the email is classified as being SPAM, the PN 606 will forward it to a quarantine MDA.

Table 1 shows the processing of an email message sent by jpq@bar.com to jones@foo.com. The Description column identifies the function being performed, either as a narrative or in terms of the logic being executed. Note that for inbound email, the MX records for the hosted domain are altered to point to the PN. The MSA may be either in the enterprise or in a data center external to the enterprise.

TABLE 1

| MSA/MTA (bar.com) | PN (foo.com) | MTA (spa.com) | Description |
|---|---|---|---|
| [Connect foo.com:25] | | | Establish connection to foo.com, which resolves to PN. [Connect foo.com:25] is indicative of a successful connection establishment to SMTP service. |
| | 220 Ready | | PN sends 220 ready response |
| EHLO bar.com | | | PN receives EHLO as a result of previous Ready response. |
| | 250 foo.com greets bar.com | | Reply to MUA/MSA with 250 OK |
| MAIL FROM jpq@bar.com | | | Set S ← jpq@bar.com |
| | 250 OK | | Accept the sender |
| RCPT TO jones@foo.com | | | Set R ← jones@bar.com<br>Status = Lookup(<S,R>)<br>If (Status == NOT Found) then<br>   Insert(<S,R>, Gray)<br>Else if (Status == TO-WHITE-LIST) then<br>   InsertAndReplace(<S,R>, White)<br>End If |
| | 250 OK | | Valid user |
| DATA | | | |
| | 354 End Marker | | Sends <CRLF>.<CRLF> as end marker |
| Actual data | | | Result = SPAMFilter(data)<br>Status = Lookup(<S,R>)<br>If (Result == SPAM) then<br>   If (Status == Black) then<br>     TP ← TP + 1 |
| Followed by | | | Else if (Status == Gray) then<br>     TP ← TP + 1<br>     InsertAndReplace(<S,R>, Black) |

TABLE 1-continued

| MSA/MTA (bar.com) | PN (foo.com) | MTA (spa.com) | Description |
|---|---|---|---|
| <CRLF>.<CRLF> | | | Else<br>  FP ← FP + 1<br>End If<br>Else<br>  If (Status != Black) then<br>    If (Status == Gray) then<br>      InsertAndReplace(<S,R>, TO-WHITE-LIST)<br>    Else if (Status == To-WHITE-LIST) then<br>      InsertAndReplace(<S,R>, White)<br>    End if<br>    TN ← TN + 1<br>  Else<br>    FN ← FN + 1<br>  End if<br>End if |
| | 250 OK | | Acknowledge the receipt of data |
| | | Connect foo.com:25] | Connection request from external MTA |
| | 220 Ready | | PN sends 220 Ready |
| | | EHLO spa.com | Hello from spa.com |
| | 250 foo.com greets spa.com | | |
| | | MAIL FROM jpq@spa.com | R ← jpq@spa.com |
| | 250 OK | | PN accepts the response |
| | | RCPT TO jones@foo.com | S ← jones@spa.com<br>Status = LookUp(<S,R>)<br>If (Status == NOT Found) then<br>  Insert(<S,R>, Gray)<br>Else if (Status == TO-WHITE-LIST) then<br>  InsertAndReplace(<S,R>, White)<br>End If |
| | 250 OK | | Response from PN |
| | | DATA | Send Data |
| | 354 End Marker | | End of Data marker |
| | | Actual data | Result = SPAMFilter(data)<br>Status = Lookup(<S,R>)<br>If (Result == SPAM) then<br>  If (Status == Black) then<br>    TP ← TP + 1<br>  Else if (Status == Gray) then<br>    TP ← TP + 1<br>    InsertAndReplace(<S,R>, Black)<br>  Else<br>    FP ← FP + 1<br>  End If<br>Else<br>  If (Status != Black) then<br>    If (Status == Gray) then<br>      InsertAndReplace(<S,R>, TO-WHITE-LIST)<br>    Else if (Status == To-WHITE-LIST) then<br>      InsertAndReplace(<S,R>, White)<br>    End if<br>    TN ← TN + 1<br>  Else |
| | | <CRLF>.<CRLF> |     FN ← FN + 1<br>  End if<br>End if |
| | 250 OK | | Acknowledge the receipt of data |

Table 1, above, sets out the commands, responses, and processing algorithms to implement an exemplary embodiment of the claimed invention. A person of ordinary skill in the art will recognize that the particular commands utilized in this example are drawn from SMTP and that the use of SMTP is a convenience and not a necessity. Any code or cipher may be substituted to suit implementation of the claimed invention in any communication system such as internet based communication applications or mobile communication services.

It should be understood that in alternate implementations of the embodiments discussed in conjunction with FIG. 4, FIG. 5, and FIG. 6, instead of sender-receiver pairs, only senders' traffic is monitored. Further, in those embodiments the senders are rated and metrics derived from statistics related to the senders are used for calculating the evaluation factors. In general, if a sender has considerably more outgoing traffic as compared to incoming traffic, the sender has a higher likelihood of being a spammer.

It should be particularly noted that various processing steps described in connection with the embodiments set out above are shown in a logical flow form, but that form should not be understood to indicate that these steps occur on the same physical systems, or that they occur in close temporal proximity. Rather, steps can be distributed to a number of physical locations, including servers or standalone computers or modules, all as understood by those of skill in the art. Moreover, those in the art will further understand that it may be found convenient to introduce time delays between steps, which can be accomplished, for example, by accumulating the results of a number of step iterations in a storage module and then calculating results based on a number of step instances. These and other implementation details are well within the skill of those in the art and should not be understood as limitations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may affect alterations, modifications and variations to the examples without departing from the scope of the invention.

What is claimed is:

1. A computer-implemented method for automated evaluation of a spam filter, the method comprising:
   rating a sender-receiver pair based on traffic information related to the sender-receiver pair;
   classifying an electronic message transmitted between the sender-receiver pair as spam or not spam using a spam filter;
   comparing the rating and the classification to generate a metric indicating the reliability of the classification, wherein the metric is one of a set of metrics; and
   evaluating the spam filter using an evaluation factor based on the set of metrics.

2. The method of claim 1 further comprising computing the evaluation factor based on one or more metrics from the set of metrics, wherein each metric in the set of metrics is accrued from a plurality of sender-receiver pairs.

3. The method of claim 1, wherein the evaluation factor is one of precision, recall, f-measure and accuracy.

4. The method of claim 3, wherein the respective values of f-measure and accuracy are directly proportionate to the performance of the spam filter.

5. The method of claim 1, wherein the rating belongs to an ordered list of ratings, the first rating in the ordered list indicating that the sender of the electronic message is known to generate spam and the last rating in the ordered list indicating that the sender of the electronic message is known not to generate spam.

6. The method of claim 1, wherein the rating is altered upon transmission of an electronic message between the sender-receiver pair.

7. The method of claim 1, wherein the rating is altered based on a numerical score accrued during an interval, wherein the numerical score is associated with the sender-receiver pair.

8. The method of claim 1 further comprising storing the rating in a hash table.

9. The method of claim 8, wherein the storing step further comprises:
   generating a hash of the sender-receiver pair using a collision-resistant hash function; and
   storing the hash with the rating of the sender-receiver pair in the hash table.

10. The method of claim 1, wherein the comparing step further includes altering the rating of the sender-receiver pair.

11. A computer-implemented system for automated evaluation of a spam filter, the system comprising:
    a server computer comprising:
    a rating module configured to rate a sender-receiver pair based on traffic information related to the sender-receiver pair; and
    a processing module operatively coupled to the rating module, the processing module including:

a spam filter configured to classify an electronic message transmitted between the sender-receiver pair as spam or not spam;

a comparison module configured to compare the rating and the classification, generating a metric indicating the reliability of the classification, wherein the metric is one of a set of metrics; and a computation module configured to compute an evaluation factor, based on the set of metrics, for evaluating the spam filter.

12. The system of claim 11, wherein the computation module is further configured to compute the evaluation factor based on one or more metrics from the set of metrics, wherein each metric in the set of metrics is accrued from a plurality of sender-receiver pairs.

13. The system of claim 12, wherein a counter accrues each metric in the set of metrics.

14. The system of claim 11, wherein the evaluation factor is one of precision, recall, f-measure and accuracy.

15. The system of claim 14, wherein the respective values of f-measure and accuracy are directly proportionate to the performance of the spam filter.

16. The system of claim 11, wherein the rating belongs to an ordered list of ratings, the first rating in the ordered list indicating that the sender of the electronic message is known to generate spam and the last rating in the ordered list indicating that the sender of the electronic message is known not to generate spam.

17. The system of claim 11, wherein the rating is altered upon transmission of an electronic message between the sender-receiver pair.

18. The system of claim 11, wherein the rating is altered based on a numerical score accrued during an interval, wherein the numerical score is associated with the sender-receiver pair.

19. The system of claim 11, wherein a storing module is configured to store the rating in a hash table.

20. The system of claim 19, wherein the storing module performs the steps of:

generating a hash of the sender-receiver pair using a collision-resistant hash function; and storing the hash with the rating of the sender-receiver pair in the hash table.

21. The system of claim 11, wherein the comparison module is further configured to alter the rating of the sender-receiver pair.

22. The system of claim 11, wherein the rating module is part of the processing module.

23. A computer-implemented method for automated evaluation of a spam filter, the method comprising:

rating a sender based on traffic information related to the sender;

classifying an electronic message transmitted by the sender as spam or not spam using a spam filter;

comparing the rating and the classification to generate a metric indicating the reliability of the classification, wherein the metric is one of a set of metrics; and evaluating the spam filter using an evaluation factor based on the set of metrics.

24. The method of claim 23 further comprising computing the evaluation factor based on one or more metrics from the set of metrics, wherein each metric in the set of metrics is accrued from a plurality of senders.

25. The method of claim 23, wherein the rating is altered upon transmission of an electronic message by the sender.

26. The method of claim 23, wherein the rating is altered based on a numerical score accrued during an interval, wherein the numerical score is associated with the sender.

27. The method of claim 23, wherein the comparing step further includes altering the rating of the sender.

* * * * *